United States Patent [19]
Sone et al.

[11] Patent Number: 5,452,469
[45] Date of Patent: Sep. 19, 1995

[54] COMMAND PERFORMING ORDER CHANGEOVER SYSTEM BASED ON INFORMATION CONTAINED IN EXECUTED COMMAND IN A DATA PROCESSOR

[75] Inventors: Takashi Sone, Tokyo; Hiroshi Takeda, Higashiyamato; Jun Satoh, Musashino; Shigeru Matsuo, Hitachi, all of Japan

[73] Assignee: Hitachi, Ltd., Tokyo, Japan

[21] Appl. No.: 164,688

[22] Filed: Dec. 9, 1993

Related U.S. Application Data

[60] Continuation of Ser. No. 902,941, Jun. 23, 1992, abandoned, which is a division of Ser. No. 290,467, Dec. 27, 1988, Pat. No. 5,155,821.

[30] Foreign Application Priority Data

Dec. 28, 1987 [JP] Japan .................. 62-332113

[51] Int. Cl.$^6$ .................. G06F 9/24; G06F 9/30; G06F 9/445; G06F 13/16
[52] U.S. Cl. .................. 395/800; 364/228.1; 364/229; 364/229.5; 364/230.4; 364/231.7; 364/240.1; 364/238.9; 364/242.91; 364/242.92; 364/245.6; 364/245.7; 364/245.9; 364/249.3; 364/254.4; 364/255.8; 364/DIG. 1; 364/DIG. 2
[58] Field of Search .................. 395/200, 800, 375, 500, 395/250, 275, 550, 725, 325, 575; 364/DIG. 1, DIG. 2; 340/825.31

[56] References Cited

U.S. PATENT DOCUMENTS

| | | | |
|---|---|---|---|
| 4,080,648 | 3/1978 | Asano et al. | 395/375 |
| 4,123,795 | 10/1980 | Dean, Jr. et al. | 395/650 |
| 4,225,922 | 9/1980 | Porter | 395/250 |
| 4,354,248 | 10/1982 | Conjer et al. | 364/724.08 |
| 4,376,976 | 3/1983 | Lahti | 395/375 |
| 4,392,198 | 7/1983 | Shimazaki | 395/400 |
| 4,527,236 | 7/1985 | Ermolovich | 395/575 |
| 4,698,785 | 10/1987 | Desmond et al. | 371/19 |
| 4,700,292 | 10/1987 | Campanini | 395/200 |
| 4,811,208 | 3/1989 | Myers et al. | 395/800 |
| 4,839,640 | 6/1989 | Ozer et al. | 340/825.31 |
| 4,866,665 | 9/1989 | Haswell-Smith | 371/19 |
| 4,879,646 | 11/1989 | Iwasaki et al. | 395/375 |
| 4,893,234 | 1/1990 | Davidson et al. | 395/800 |
| 4,918,435 | 4/1990 | Ryouki et al. | 340/147 |
| 4,972,314 | 11/1990 | Getzinger et al. | 395/425 |

*Primary Examiner*—Alyssa H. Bowler
*Assistant Examiner*—Daniel H. Pan
*Attorney, Agent, or Firm*—Fay, Sharpe, Beall, Fagan, Minnich & McKee

[57] ABSTRACT

A slave controller formed on a single semiconductor substrate executes a built in control algorithm in response to a command supplied from a master controller. Upon completion of command execution, the controls respond to predetermined information contained within the command by branching internal control operation in accordance with the new command. The controls then suspend a series of operations for executing the new command upon detection of the branch condition. Once the internal state has been changed over, the slave controller sends an instruction to the master controller.

8 Claims, 4 Drawing Sheets

COMMAND PERFORMING ORDER CHANGEOVER SYSTEM BASED ON INFORMATION CONTAINED IN EXECUTED COMMAND IN A DATA PROCESSOR

This is a continuation of application Ser. No. 07/902,941, now abandoned, filed Jun. 23, 1992, which is a divisional of Ser. No. 07/290,467 filed on Dec. 27, 1988, now U.S. Pat. No. 5,155,821 issued Oct. 13, 1992.

BACKGROUND OF THE INVENTION

The present invention relates to a slave controller wherein a command supplied from a master controller is executed according to a built-in control algorithm. More particularly, it relates to techniques which are effective when applied to, for example, a command break control or the stop of the execution of a command to be executed asynchronously to the master controller, and software debug with notice taken of a peripheral controller.

In a system including a processor, a peripheral controller is included as a slave controller which receives a command from a host processor such as a master controller and executes it, whereby a multiprocessor construction or multitasking can be adopted. Thus, lightening the burden of the master controller and also enhancing the efficiency of system operations are achieved. For example, in a graphic system, display controller which supports a display control and drawing control for a frame buffer is included, whereby when the graphic controller is executing a command received from the host processor, this host processor can execute another control process.

Meanwhile, for the software debug and system evaluation of a processor system, it is possible to utilize a system development tool which determines the errors of a program in such a way that the program of the system to be debugged is actually executed and such execution is traced. Functions which the system development tool offers are to execute the program from any desired address by means of a host processor, to stop the execution of the program by the host processor after a designated condition has held, to track various kinds of bus information items and display the tracked contents during the execution of the program, and so forth. In particular, a so-called break point control for stopping the execution of the program after the holding of the designated condition is the function which centers around the state of the program execution by the host processor, and according to which the execution of the program by the host processor is stopped when the occurrences of predetermined phenomena are detected on the basis of the various information items of buses coupled to the host processor.

On the other hand, the software debug of the system is requested to be done with notice taken of a desired peripheral controller. For such a request, the conventional system development tool which realizes the software debug while centering around the host processor cannot be utilized as it is. The inventors therefore performed studies on the software debug with notice taken of the peripheral controller, and they have drawn the following conclusions: In that case, the occurrence of an error attendant upon the execution of a command needs to be appropriately grasped by causing the peripheral controller to execute the command in stages, and to this end, the command execution by the peripheral controller needs to be stopped at will.

By the way, an example of literature stating the break point control of a system development tool such as emulator is "LSI Handbook," p. 562, published by The Ohm-Sha, Ltd. on Nov. 30, 1984.

Regarding the conclusions mentioned above, the slave controller, such as a peripheral controller, executes individual commands in accordance with a control algorithm peculiar thereto as configured of micro programs, and the individual commands require unequal execution times, depending upon the processing contents thereof. By way of example, when lines are drawn by the graphic controller, command execution times corresponding to the thicknesses and lengths of the lines are required. Therefore, when the software debug is performed with notice taken of the peripheral controller, it is difficult, while the execution end timings of the individual commands in the peripheral controller concerned are being properly grasped outside the peripheral controller, to stop the command execution operations at predetermined timings on the basis of an external control. Especially in a peripheral controller which adopts an interface of the type wherein, for the purpose of preventing the lowering of the system operation efficiency attributed to overheads involved in transferring commands and parameters by means of the host processor, a train of commands, etc. as needed are loaded in a buffer of, e.g., the first-in first-out or FIFO type beforehand, the given commands are successively executed according to an internal operation sequence, and hence, it is more difficult to stop the command execution operations at the predetermined positions of the command train. Therefore, the software debug with the peripheral controller noticed has inevitably been coped with by altering the program of the host processor much for that purpose only. For example, it has been coped with by the expedient that the command train for the peripheral controller as contained in the regular program is decomposed, whereupon a specified command et seq. are prevented from being transferred, or stop commands are inserted into predetermined positions.

The inventors' studies, however, have revealed that, with such an expedient, the program is drastically altered due to the decomposition of the command train, the insertion of the stop commands, etc. As a further problem, a command transfer program and program storage means must be remade due to change in the number of words to-be-transferred of the command train thus altered, and the remaking operations are not easy and form a cause for the critical difficulty of the software debug with the peripheral controller noticed.

SUMMARY OF THE INVENTION

An object of the present invention is to provide a slave controller which can establish its internal control state by itself without receiving the direct directions of a master controller, after having executed a desired command. Another object is to provide a slave controller which can perform the control of stopping the next command executing operation by itself after having executed a desired command externally given, without greatly altering a regular program for a master controller, and which can contribute to the facilitation of software debug centering around the slave controller itself.

The aforementioned and other objects and novel features of the present invention will become apparent from the description of this specification and the accompanying drawings.

A typical aspect of performance of the present invention is briefly summarized as follows:

A slave controller wherein a command supplied from a master controller is executed according to a built-in control algorithm comprises control means capable of changing-over an internal control operation on the basis of predetermined information contained in a desired command and after the end of the execution of the command, and instruction means for sending out an internal state changed-over by the control means. By way of example, the control means judges the predetermined information contained in the desired command, as one of conditions for branching the internal control operation in accordance with the built-in control algorithm, and upon detecting the fulfillment of the branch condition, it performs the control of suspending a series of internal operations for executing a new command.

According to the above expedient, in performing the software debug with notice taken of the slave controller, the predetermined information contained in the desired command of the regular program for the master controller is rewritten into command break information beforehand. Thus, when the slave controller has executed the command in accordance with the command code thereof, it performs the branch control based on the command break information as a criterion in accordance with the built-in control algorithm and once suspends the series of internal operations for the execution of the new command by itself, the suspension control state being sent out. Upon recognizing this state, the external master controller controls the slave controller by branching to a software debug routine for the slave controller as occasion demands, in a manner to be capable of acknowledging the state of the command execution by the slave controller before the suspension and canceling the suspension control state. In this way, the control in which, after executing the predetermined command given from the master controller, the slave controller suspends the operation of executing the next command by itself is realized without greatly altering the regular program for the master controller, and the facilitation of the software debug with the slave controller noticed is achieved.

DESCRIPTION OF THE PREFERRED EMBODIMENTS

Figure 1:
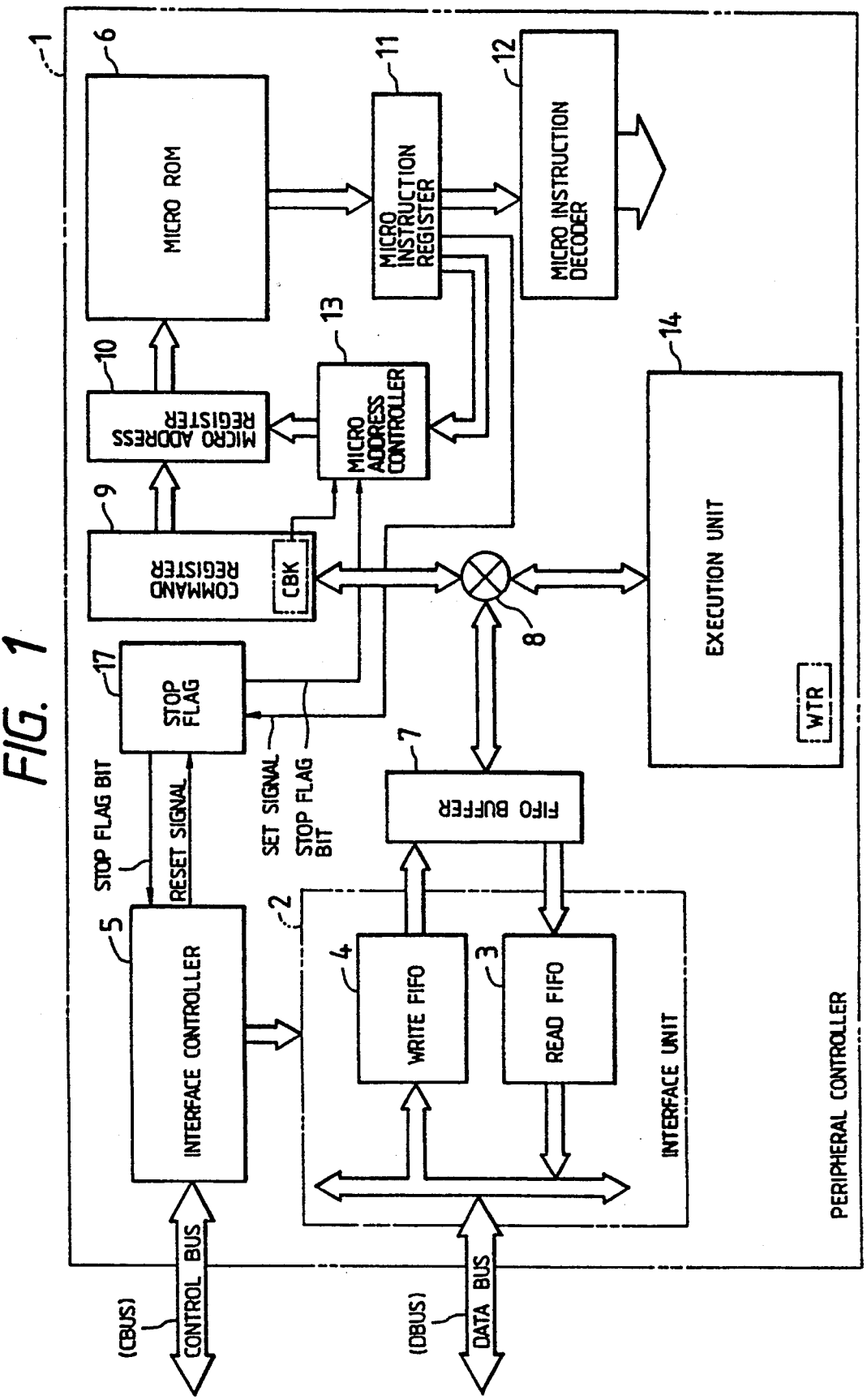
FIG. 1 is a block diagram of a peripheral controller which is an embodiment of the present invention.

FIG. 1 is a block diagram of a peripheral controller which is one embodiment of the present invention.

The peripheral controller 1 in FIG. 1 is applied to a microcomputer system or microprocessor system, and is used as a graphic display controller, a controller for disks, a controller for communications, a direct memory access controller, or the like. The peripheral controller 1 executes a command received from a host processor as a master controller, not shown, in accordance with a built-in control algorithm. This peripheral controller 1 is formed on a single semiconductor substrate by known techniques for manufacturing semiconductor integrated circuits, or it can alternatively be formed on an identical semiconductor substrate together with other peripheral controllers or peripheral circuits or with the host processor.

Figure 6:
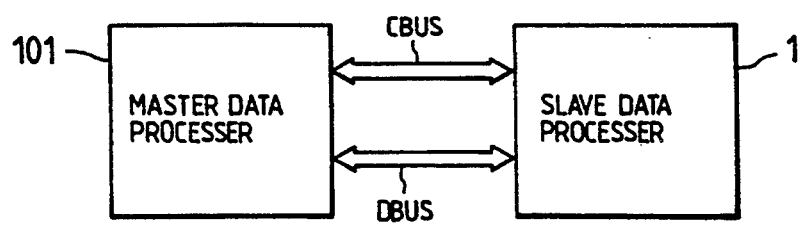
FIG. 6 is a block diagram showing the relationship between the peripheral controller functioning as a slave data processor and a master data processor for controlling this peripheral controller.

Although not especially restricted, the peripheral controller (or slave data processor) 1 of this embodiment comprises a read FIFO 3 and a write FIFO 4 in an interface unit 2 which is connected with the host processor (or master data processor) 101 through a data bus DBUS, etc. The relationship between the slave data processor 1 and the master data processor 101 is shown in FIG. 6. Although no special restriction is meant, each of the read FIFO 3 and the write FIFO 4 is constructed of a FIFO memory of the so-called first-in first-out type which includes a random access memory as the principal constituent thereof. The write FIFO 4 can store therein a train of commands, parameters, and series of various other data items supplied from the host processor through the data bus DBUS as well as external terminals (not shown), in the order of the supply and can afford them to the interior of the peripheral controller 1 in that order. The read FIFO 3 can store therein internally processed data, etc. in order for the purpose of affording them to the exterior of the peripheral controller 1 and can deliver them to the exterior in that order.

The control of the interface unit 2 is performed by an interface controller 5 which is coupled to the host processor through a control bus CBUS. The interface controller 5 controls the transfer of the data and commands from the data bus DBUS to the write FIFO 4, and also controls the transfer of the data from the read FIFO 3 to the data bus DBUS. In the data transfer control, the interface unit 2 supplies the interface controller 5 with the status signals of each of the read FIFO 3 and the write FIFO 4, such as of the data holding state of "empty/full" and the end of the data transfer, while the interface controller 5 modifies the status signals and gives them back to the host processor, whereby a handshake control for the exchanges of the data and commands is carried out. In addition, the data input control of the read FIFO 3 and the data output control of the write FIFO 4 are performed according to a control algorithm peculiar to the peripheral controller 1.

In the peripheral controller 1 of this embodiment, the peculiar control algorithm for executing the commands given from the host processor is formed of a micro program though not especially restricted. The micro program is configured of micro instructions which are stored in a micro ROM (read-only memory) 6. Each of the individual micro instructions contains one or more items of micro operation information, address information such as the next micro address for performing the sequence control of a micro instruction series, constant information as needed for the micro instruction, time information for a timing control, etc.

The command stored in the write FIFO 4 is fetched into a command register (also termed "micro instruction register") 9 through a FIFO buffer 7 as well as a gate 8. Although not especially restricted, a head micro address contained in the address field of the fetched command is supplied to a micro address register 10. The micro ROM 6 reads out a predetermined micro instruction in response to address signals delivered from the micro address register 10, and the micro instruction read out of the micro ROM 6 is supplied to a micro instruction register 11. This micro instruction is decoded by a micro instruction decoder 12, whereby various control signals for controlling the internal operations of the peripheral controller 1 are generated. The second micro address et seq. and branch address of a predetermined micro instruction series, and the head micro addresses of a command fetch routine and other predetermined routines are generated by a micro address controller 13 though no special restriction is intended. The micro address controller 13 supplies the micro address register 10 with micro address information which is contained in the next-address field of the micro instruction. Besides, in a case where the judgment of a branch condition is directed, the micro address controller 13 detects the fulfillment of the predetermined branch condition, whereupon it generates a branch destination micro address and supplies this micro address to the micro address register 10 instead of the micro address information contained in the next-address field of the micro instruction. Further, on the basis of the directions of the host processor, etc., the micro address controller 13 generates the head micro addresses of the command fetch routine etc. and supplies them to the micro address register 10.

In FIG. 1, numeral 14 denotes an execution unit which comprises an arithmetic-logic unit and several registers, and which executes the command on the basis of the output control signals of the micro instruction decoder 12. Operands, parameters etc. which are necessary for the command execution are supplied through the FIFO buffer 7 and the gate 8 from the write FIFO 4. Information obtained by the execution of the command is supplied to the read FIFO 3 through the gate 8 and the FIFO buffer 7, or to a local bus through a local side interface unit, not shown.

The peripheral controller of this embodiment comprises a command break mechanism for a control according to which, on the basis of the program state of the predetermined information bit of the command given from the host processor, a series of internal operations for executing a new command subsequent to the given command are once suspended after the execution of the given command. Now, the command break mechanism will be described in detail.

Figure 2:
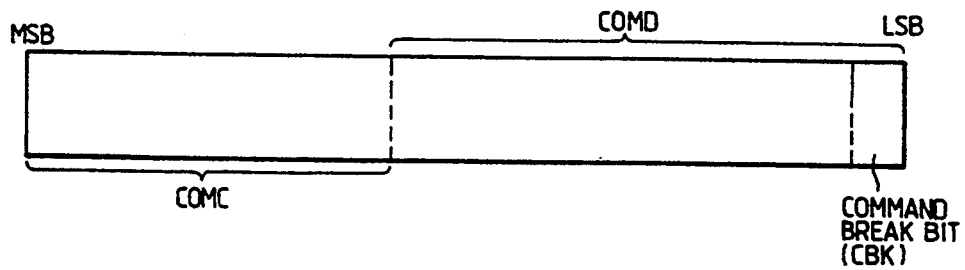
FIG. 2 is a diagram for explaining a command format for the peripheral controller.

First, the format of the command which is supplied to the peripheral controller 1 of this embodiment is as illustrated in FIG. 2 though no special restriction is meant. A code for designating the sort of the command is stored in the more significant bit-side field COMC of the format, and a code for any other attribute required for the command execution is arranged in the less significant bit-side field COMD thereof, the least significant bit of which is particularly set as a command break bit CBK. Although not especially restricted, the command break bit CBK is used as one criterion for various branch controls in the peripheral controller 1. The bit "1" of the command break bit CBK directs a branch to a command break routine for the control of suspending the series of internal operations necessary for the new command which follows the command containing this bit "1." On the other hand, the bit "0" of the command break bit CBK does not direct the branch to the command break routine, but it directs the ordinary control operation conforming to the next micro address supplied from the micro instruction register 11.

Although no special restriction is meant, the command break bit CBK is directly supplied to the micro address controller 13 through the command register 9. According to this embodiment, the command break bit CBK is held in the command register 9 together with the command containing this bit until the execution of the corresponding command is ended. The micro address controller 13 is directed to judge the branch condition based on the command break bit CBK in accordance with a micro program control. Although not especially restricted, this direction is given by the last micro instruction of each of the individual micro instruction series required for executing various commands. When directed to judge the branch condition, the micro address controller 13 determines the propriety of the branch in accordance with the value "1" or "0" of the command break bit CBK, and it generates a micro address corresponding to the break bit value and transfers the address to the micro address register 10.

Figure 3:
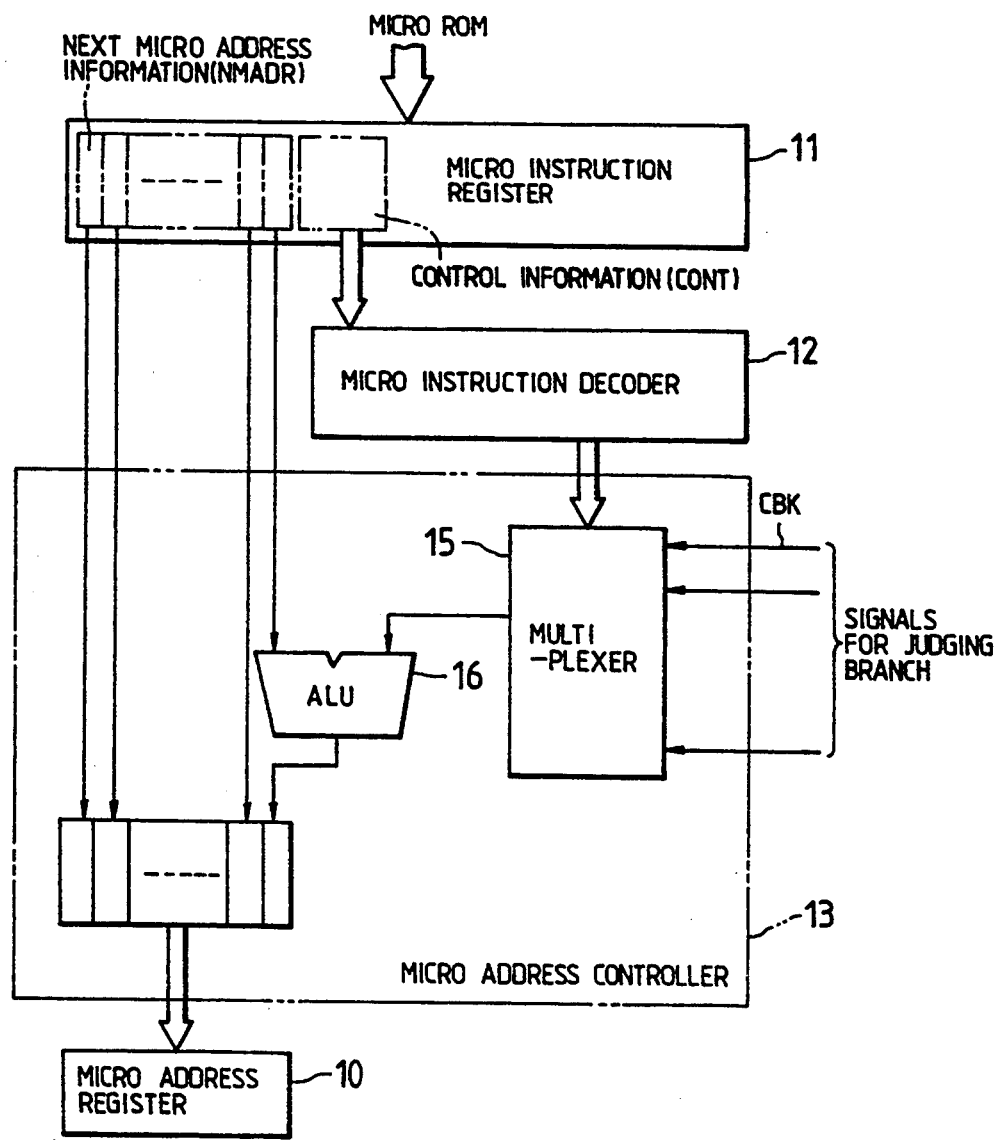
FIG. 3 is a block diagram schematically showing an example of a branch control procedure for a command break routine.

FIG. 3 is a block diagram schematically showing the control procedure of the branch to the command break routine. When the predetermined micro instruction is latched in the micro instruction register 11, predetermined control information CONT contained therein is applied to the micro instruction decoder 12. In a case where the direction of the judgment of the branch condition as based on the command break bit CBK is contained in the control content of the micro instruction, the micro address controller 13 controlled by this micro instruction directs a multiplexor 15 supplied with criteria for various branches, to deliver the command break bit CBK which is one of the criteria. Although no special restriction is meant, the command break bit CBK thus selected has the exclusive OR taken with one predetermined bit of next micro address information NMADR contained in the micro instruction on that occasion, by an arithmetic-logic unit 16, and the result is supplied to the micro address register 10 as the head micro address of a micro instruction series to be subsequently processed. When the command break bit CBK is "1" at this time, the predetedetermined bit of the next micro address information NMADR contained in the micro instruction is inverted, and micro address information thus obtained is used as the micro address of the branch destination to the command break routine. On the other hand, when the command break bit CBK is "0" at this time, the predetermined bit of the next micro address information NMADR contained in the micro instruction is left intact without being inverted, whereby a branch destination micro address for the next micro instruction series directed by the micro instruction, for example, for a new command fetch routine is designated to permit the continuation of the ordinary operation.

Accordingly, for the purpose of stopping the regular command execution of the peripheral controller 1 in the system operation at will in a case where software debug with the peripheral controller 1 noticed is performed while the peripheral controller 1 is kept executing commands in stages so as to properly grasp the occurrences of errors attendant upon the command execution, the command break bit CBK contained in each of the commands to be stopped after having been executed may be rewritten into "1," and complicated alterations for the regular programs of the system, such as the resetting of the normal commands, the insertion of stop commands and the change of a command transfer program, are not required.

Although not especially restricted, the command break routine includes a control step for rendering the micro program control, in effect, a non-operation in order to stop the execution of the new command. By way of example, it is constructed including a micro step for stopping the generation of the new micro address by the micro address controller 13 and forming a non-operation loop.

In addition, the command break routine includes a control step for indicating this state to the host processor. By way of example, it includes a micro step for setting a stop flag 17 as formed by a flip-flop. The status of the stop flag 17 is freely accessed by the host processor through the interface controller 5 which is under the control of the host processor. Thus, the host processor can recognize the command break state of the peripheral controller 1. Although no special restriction is meant, the host processor monitors the status of the stop flag 17 at a predetermined timing, and upon detecting the set status thereof, it allows an interrupt and executes a software debugging subroutine for the peripheral controller 1. The software debugging subroutine is especially added to the regular system program for the software debug with the peripheral controller 1 noticed, and it is required, for example, in a case where processed contents executed by the peripheral controller 1 to be brought into the break point state are indicated on, e.g., an unshown display on the local side including the peripheral controller 1, thereby making it possible to acknowledge the executed contents. Such a subroutine, however, is endowed with proper contents in accordance with the operation of the peripheral controller to which the software debug is directed (namely, the processed contents to be acknowledged) or the contruction of a system to which the software debug is directed.

Further, for such a case where the peripheral controller 1 is caused to execute a software debugging command at the stop of the execution of the regular commands in the system program, the command break routine can be constructed including a micro step for clearing the regular commands which remain in the write FIFO 4 in the command break mode. More specifically, the regular commands remaining in the write FIFO 4 are internally transferred from the FIFO buffer 7 to the read FIFO 3. Thus, the peripheral controller 1 is brought into the state in which it can subsequently fetch a specified command necessary for the execution of the software debugging subroutine by the host processor. Such write FIFO clear processing accessory to the command break routine is required according to the functions of the peripheral controller and the contents of the software debug for the peripheral controller. Incidentally, the write FIFO clear processing in the command break routine is permitted to be selected in such a way that a plurality of operation modes are prepared for the command break routine beforehand and that they are rendered selectable under the directions of the host processor or by increasing the number of bits of the command break bit CBK.

The non-operation state of the peripheral controller 1 attained by the execution of the command break routine is permitted to be canceled in such a way that the stop flag 17 is reset by the access of the host processor through the interface controller 5. More specifically, the content (stop flag bit) of the stop flag 17 is also applied to the micro address controller 13, and when the stop flag 17 is reset, the micro address controller 13 generates a micro address for a new command fetch routine.

Thus, the peripheral controller 1 becomes capable of executing a new command subsequently to the state in which it stops the command execution. On this occasion, in a case where the peripheral controller 1 once brought into the non-operation state by the command break routine need not execute the software debugging command, it is permitted to continuously execute the regular commands remaining in the write FIFO 4. In contrast, in a case where the peripheral controller 1 once brought into the non-operation state by the command break routine executes the software debugging command, it fetches and executes the software debugging command which is transferred from the host processor after the clear processing of the write FIFO 4. By the way, in the case where the peripheral controller 1 executes the software debugging command in the command break state, the host processor returns the remaining regular commands internally transferred to the read FIFO 3 by the clear processing of the write FIFO 4, to this write FIFO 4 and permits the peripheral controller 1 to continuously execute the regular commands after the software debugging command has been executed by the peripheral controller 1.

Figure 4:
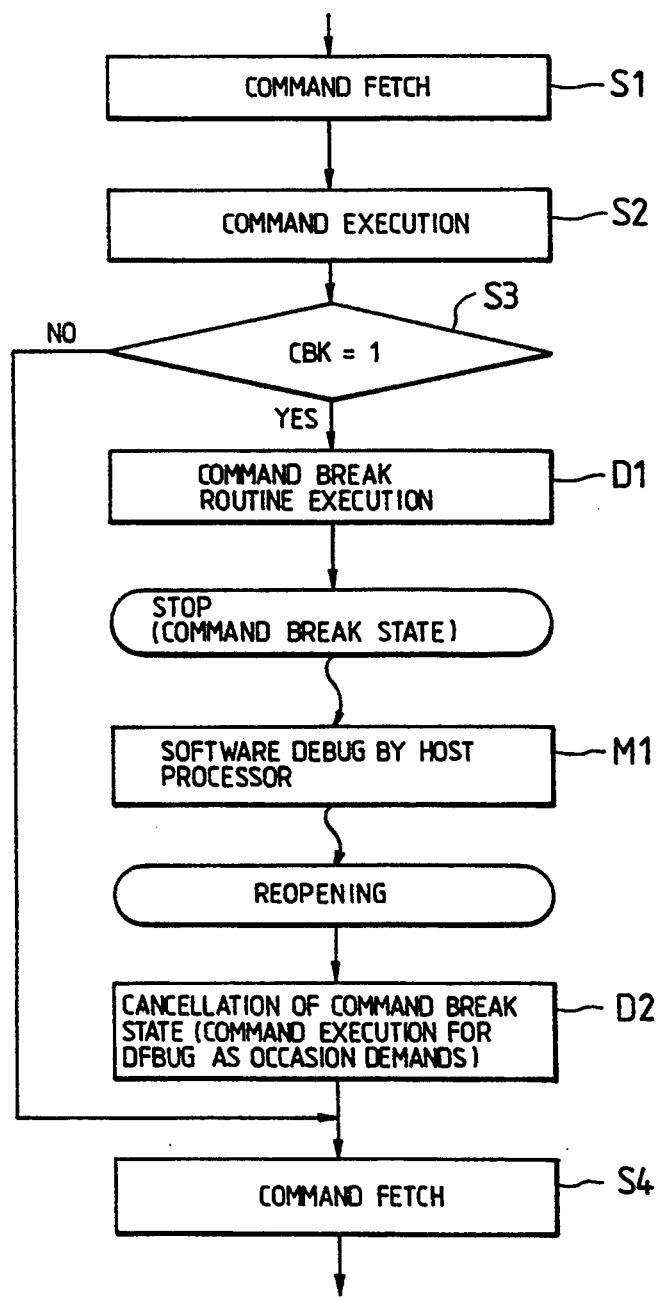
FIGS. 4 and 5 are flow charts for explaining the operation of a command break mechanism in the peripheral controller.

Next, the operation of the command break mechanism in the peripheral controller 1 of this embodiment will be described by referring also to a flow chart of FIG. 4.

In the ensuing description of the operation, it is assumed to utilize the command break mechanism in a case where the software debug of a system including the peripheral controller 1 is performed with notice taken of this controller 1. That is, the command break mechanism is utilized when the software debug with notice taken of the peripheral controller 1 is to be performed while the peripheral controller 1 is kept executing commands in stages so as to properly grasp the occurrences of errors attendant upon the command execution. In this case, the command break bit CBK contained in each of the commands after which the command execution is to be stopped is rewritten into "1" beforehand in order that the command execution of the peripheral controller 1 as is regular in the operation of the system may be stopped at will. Further, in a case where the host processor requires a software debugging subroutine for the peripheral controller 1 at the stop of the regular command execution of the peripheral controller 1, the subroutine is added to the regular system program of the host processor side beforehand.

When, in this state, the host processor is caused to execute the adjusted system program, the train of commands needed for the peripheral controller 1 is supplied to the write FIFO 4 under the control of the host processor. The peripheral controller 1 executes a command fetch routine in accordance with a built-in control algorithm peculiar thereto (step S1). At this step, the head command transferred to the write FIFO 4 is transferred to the command register 9, and the head micro address contained in the command is supplied to the micro address register 10.

Owing to the execution of the command fetch routine, the peripheral controller 1 branches to a series of micro flows starting from the head micro address designated by the command, and it executes the command while reading out micro instructions successively in a predetermined procedure and subjecting the execution unit 14 to an arithmetic control etc. (step S2). The executed contents of the individual commands are concretely different, depending upon the designated contents of the commands. By way of example, they are the processing of data accepted from outside the peripheral controller 1, the external outputting of data generated inside, and the external outputting of the judged result of an internal state.

When the commands are successively executed in this manner, each of the last micro instructions of the individual micro instruction series of the commands directs the judgement of a branch condition based on the command break bit CBK in accordance with this embodiment. When the direction of the judgment of the branch condition is given, the micro address controller 13 determines the propriety of the branch in accordance with the value "1" or "0" of the command break bit CBK supplied from the command register 9 and generates the corresponding micro address (step S3).

More specifically, in a case where the command break bit CBK is "0," the branch destination micro address for a command fetch routine is generated, whereupon the next command is transferred from the write FIFO 4 to the command register 9 (step S4), and the ordinary operation of executing the command is continued.

On the other hand, in a case where the command break bit CBK is "1," the branch destination micro address for a command break routine is generated, and the command break routine is executed (step D1). According to this embodiment, when the branch destination micro address for the command break routine is transferred to the micro address register 10, a micro step for stopping the generation of a new micro address by the micro address controller 13 and forming a non-operation loop is executed, and the stop flag 17 is set. Thus, the peripheral controller 1 attains a command break state for stopping the operation of executing a new command which succeeds the command having the command break bit CBK of the value "1" and which is regular in the system operation.

The host processor is periodically monitoring the status of the stop flag 17. Upon detecting the set status of the flag, it allows an interrupt to execute a software debugging subroutine for the peripheral controller 1 and can acknowledge contents executed by the peripheral controller 1 until the command break state is reached (step M1).

Thereafter, in reopening the operation of the peripheral controller 1, there exists a case where the peripheral controller 1 is caused to execute a software debugging command and a case where it is not, depending upon the sort of the peripheral controller 1 and the contents to be acknowledged.

Figure 5:
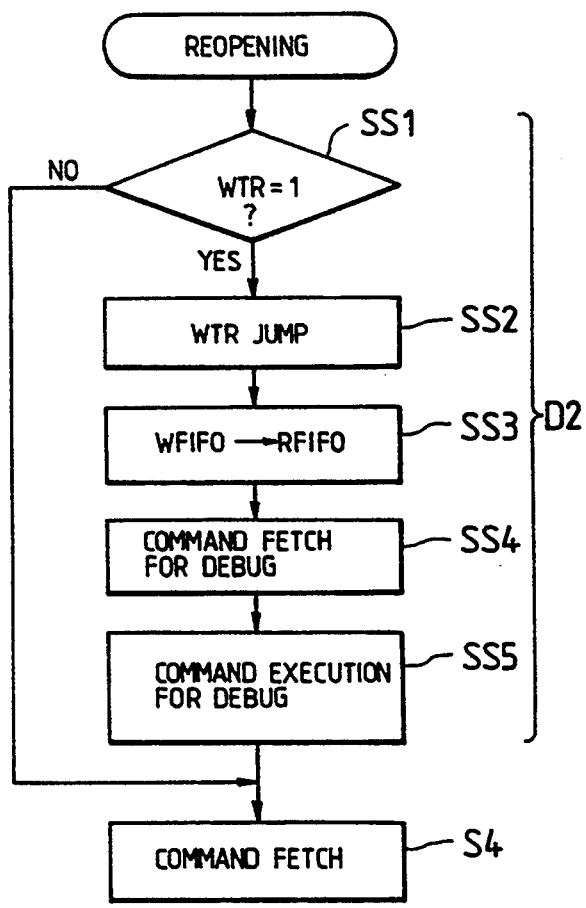

For example, in the case of a control in which the contents executed by the peripheral controller 1 are indicated on the unshown display of the local side including this peripheral controller 1, so as to be capable of acknowledging the executed contents, the operation of the peripheral controller 1 is reopened for causing the peripheral controller 1 to execute the software debugging command (step D2). Whether or not the software debugging command is executed, is selected according to a flag WTR which is provided in the execution unit 14. A more detailed flow chart within the step D2 is shown in FIG. 5.

At a step SS1, the set status (logic "1") of the flag WTR is judged. When the flag WTR is set (YES), a predetermined micro address to which the control flow is to be jumped is set in the micro address register 10 (step SS2). Subsequently, a micro step (SS3) for internally transferring the unexecuted commands remaining in the write FIFO 4 to the read FIFO 3 is executed. The host processor transfers the software debugging command to the write FIFO 4 subjected to the clear processing (step SS4), and resets the stop flag 17, thereby directing the micro address controller 13 to branch to the command fetch routine. Thus, the peripheral controller 1 is turned from the command break state into a state in which it can execute the new command, and it executes the software debugging command as predetermined (step SS5). On this occasion, the host processor returns the remaining regular commands internally transferred to the read FIFO 3 by the clear processing of the write FIFO 4, to the write FIFO 3 after the software debugging command. Accordingly, after executing the software debugging command, the peripheral controller 1 fetches the remaining commands of the regular command train the execution of which has been suspended (step S4), and it restarts executing them. By the way, when the command break bit CBK is previously set also in the software debugging command, the timing of restarting the execution of the regular commands after the end of the execution of the software debugging command can be controlled at will.

In the case where the peripheral controller 1 need not execute the software debugging command, the host processor returns the remaining regular commands internally transferred to the read FIFO 3 by the clear processing of the write FIFO 4, to the write FIFO 3, and it resets the stop flag 17, thereby directing the micro address controller 13 to branch to the command fetch routine. Thus, the peripheral controller 1 fetches the remaining commands of the regular command train the execution of which has been suspended by the command break state (step S4), and it restarts executing them.

According to the above embodiment, the following functional effects are attained:

(1) A command break bit CBK contained in the desired command of a regular system program is rewritten into "1" beforehand, whereby when the command has been executed, a peripheral controller 1 performs a branch control employing the command break bit CBK as a criterion, in accordance with the built-in control algorithm thereof, and it controls itself so as to once suspend a series of internal operations for executing a new command. Thus, the command execution of the peripheral controller 1 can be stopped at will without greatly depending upon the software of a host processor side and with ease.

(2) Owing to the functional effect stated above, the command execution can be controlled to stop at any desired position in a command train, in accordance with the setting of "1" or "0" for the command break bit CBK. Therefore, in such a case where software debug with notice taken of the peripheral controller 1 is performed while the peripheral controller 1 is kept executing commands in stages so as to properly grasp the occurrences of errors attendant upon the command execution, complicated alterations for the regular program of a system as in the prior art, such as the resetting of the regular command train, the insertion of stop commands and the change of a command transfer program, are not required, and the software debug with the peripheral controller 1 noticed can be performed while the alterations of software for the peripheral controller 1 are confined to the minimum.

(3) The host processor can freely recognize the command break state of the peripheral controller 1 through a stop flag 17. Therefore, it can immediately cope with the command break state of the peripheral controller 1.

(4) Owing to the functional effects stated above, upon recognizing the command break state of the peripheral controller 1, the host processor can branch to a software debugging routine and perform various software debug processes for the peripheral controller 1. Therefore, the software debug with the peripheral controller 1 noticed can be readily performed by the use of an actual system without requiring any special system development tool and merely by adding a software debugging subroutine to the regular system program of the host processor side and rewriting the command break bit CBK.

Although, in the above, the invention made by the inventors has been concretely described in conjunction with the embodiment, the present invention is not restricted thereto but can be variously modified within a scope not departing from the purport thereof.

By way of example, a system for branching to a command break routine is not restricted to the system in which, as in the foregoing embodiment, the address of the branch is formed according to the result of the exclusive OR between the command break bit CBK and one predetermined bit of a next micro address, but it may well be a system in which a branch destination address for the command break routine is also preset in a micro program, and this branch destination micro address for the command break routine or a micro address for an ordinary operation is selected according to the command break bit CBK. In addition, systems for generating the next address and the branch address by means of the micro address controller 13 are not restricted to the systems of the embodiment, but they can be properly changed. By way of example, the generation of the next micro address in the ordinary operation may well make use of the increment or decrement of count means. Further, in the embodiment, the command break bit CBK is formed of one bit so as to perform the bidirectional branch, but the number of bits of the command break information can be increased in order to increase the number of branching directions.

Besides, the embodiment has referred to the case where the direction of the judgment of a branch condition for the command break routine is contained in the last micro instruction of each micro instruction series, but the directions may well be given by a command break judgment routine which is shared by the respective micro instruction series.

Besides, the content of the command break routine is not restricted to that in the embodiment, but by way of example, it is also possible to omit the clear processing for the write FIFO 4 or to render the processing selectable. In the embodiment, the software debugging command is rendered acceptable by performing the clear processing of the write FIFO 4 in the command break routine. However, the software debugging command for acknowledging the executed contents of commands need not be positively rendered acceptable for, for example, a display controller with which the command execution contents can be visually acknowledged through a display. In such a case, it is possible to provide a mode setting mechanism for the content of the command break routine, whereby the propriety of the operation can be selected for specified processing such as the write FIFO clearing. In a case where the write FIFO clearing is not performed, the control for causing the peripheral controller 1 to restart processing may be only the operation of resetting the stop flag 17. In the case of performing the mode change-over control for the content of the command break routine, it is possible to adopt suitable mode change-over means such as a system in which storage means for setting the mode change-over is built in, or a measure in which the number of bits of the command break information is increased. By the way, the clear processing of the write FIFO is not restricted to the processing of transferring the remaining regular commands to the read FIFO, but it can be properly altered according to the intended software debug operation of the peripheral controller.

Moreover, the means for externally indicating the command break state is not restricted to the stop flag 17, but it can be replaced with, for example, a circuit arrangement which supplies an interrupt signal to, for example, the host processor.

In addition, the built-in control algorithm of the peripheral controller need not always be formed of the micro program, but it may well be changed to a wired logic which employs a programmable logic array or the like. Further, the command fetch mechanism of the peripheral controller is not restricted to the construction which includes the FIFO.

In the foregoing, the invention made by the inventors has been chiefly described as to the case of application to that software debug with notice taken of a peripheral controller which forms the background field of utilization. However, the present invention is not restricted to the application referred to, but it is extensively applicable as sequencing means in such a case where the relationship of sequence is required between the processing of the peripheral controller and that of a host processor. The present invention is applicable to devices each of which is subject to, at least, the condition that a command supplied from a master controller is executed according to a built-in control algorithm.

What is claimed is:

1. A method of controlling processing in a data processor which has a micro ROM for outputting a micro instruction in response to a command, executing means for processing data in response to said micro instruction, command storage coupled to a first external terminal and for sequentially storing a plurality of commands, including the command, provided to the data processor from an external source, and data storage means coupled to the first external terminal and for storing the data processed by said execution means, the method comprising steps of:

(a) transferring the command stored in said command storage means to said micro ROM;

(b) executing a predetermined operation in accordance with the command in the execution means;

(c) setting a flag in the execution means by the predetermined operation;

(d) transferring said plurality of commands to be executed, the plurality of commands being stored in said command storage means after the flag is set, to said data storage means without passing through the execution means;

(e) storing a new command into the command storage means after the plurality of commands to be executed are transferred into the data storage means;

(f) returning said plurality of commands, transferred to said data storage means in step (d), to said command storage means after execution of the new command; and (g) controlling said micro ROM in accordance with said plurality of commands returned to the command storage means.

2. The method according to claim 1, further comprising designating said data processor as a slave processor and supplying the slave processor with said plurality of commands from a master processor.

3. The method according to claim 2, further comprising providing each of said command storage means and said data storage means in said data processor with a first in-first out buffer.

4. The method according to claim 2, further comprising providing each of the plurality of commands with an information bit for halting a predetermined operation of the next command.

5. The method according to claim 4, further comprising executing a command break routine after the command including the information bit for halting is executed.

6. The method according to claim 5, further comprising providing a delay operation function as the command break routine.

7. The method according to claim 6, further comprising setting flag means after the command including the information bit for halting is executed.

8. The method according to claim 7, wherein the command break routine is a debug operation function.

* * * * *